US008055001B2

(12) United States Patent
Boguslavskij

(10) Patent No.: US 8,055,001 B2
(45) Date of Patent: Nov. 8, 2011

(54) OPERATING DEVICE FOR A HEARING AID

(75) Inventor: Mihail Boguslavskij, Coburg (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 690 days.

(21) Appl. No.: 12/283,924

(22) Filed: Sep. 16, 2008

(65) Prior Publication Data

US 2009/0087004 A1 Apr. 2, 2009

(30) Foreign Application Priority Data

Sep. 28, 2007 (DE) ......................... 10 2007 046 435

(51) Int. Cl.
*H04R 25/00* (2006.01)
*G06K 9/00* (2006.01)

(52) U.S. Cl. ........ 381/315; 381/314; 382/116; 382/124; 340/5.53; 340/5.83

(58) Field of Classification Search ........................ None
See application file for complete search history.

(56) References Cited

U.S. PATENT DOCUMENTS 5,012,520 A * 4/1991 Steeger ......................... 381/315
5,341,433 A * 8/1994 Meyer et al. .................. 381/324
7,142,681 B2 * 11/2006 Kortekaas ..................... 381/315

FOREIGN PATENT DOCUMENTS

EP 1128334 A1 8/2001
EP 0 548 379 A1 9/2007

* cited by examiner

*Primary Examiner* — Hoang-Quan Ho

(57) ABSTRACT

An especially small operating device for a hearing aid, but one which is nevertheless simple for a user to actuate manually, which still enables a multiplicity of different operating functions in a simple and clear manner is provided. The use of a fingerprint sensor is provided for this purpose, whereby different operating functions are assigned to the individual fingers of the user. Depending on the finger with which the user actuates the fingerprint sensor, different operating functions are initiated.

19 Claims, 1 Drawing Sheet

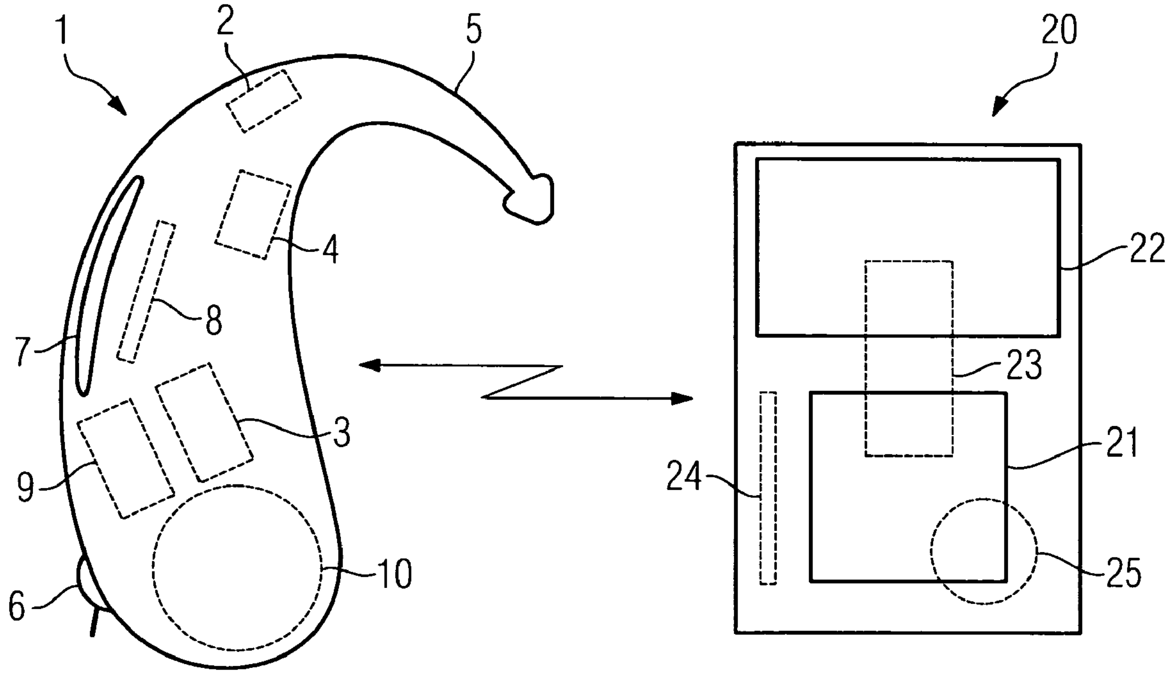
1
2
5
4
8
7
3
9
10
6
20
22
23
21
24
25

OPERATING DEVICE FOR A HEARING AID

CROSS REFERENCE TO RELATED APPLICATIONS

This application claims priority of German application No. 10 2007 046 0435.7 DE filed Sep. 28, 2007, which is incorporated by reference herein in its entirety.

FIELD OF INVENTION

The invention relates to an operating device for a hearing aid, which comprises at least one control element which can be actuated by a user, whereby at least one parameter influencing the signal processing in the hearing aid can be modified by means of a single actuation of the control element by a finger of the user.

BACKGROUND OF INVENTION

A multiplicity of different possibilities is known with regard to the operation of electrical devices by a user. One possible way of generating different user inputs or operator functions for a device is to use a keypad with a particular number of keys which can be actuated manually.

SUMMARY OF INVENTION

Keypads do however have the disadvantage that they occupy a relatively large amount of space and are therefore not suitable or are only poorly suited particularly in the case of operating devices where an especially small form of construction is a primary consideration.

In order to solve the stated problem, a method is known for making multiple assignments for certain keys on the keypad, for example keys on a mobile telephone which, depending on the current operating state of the mobile telephone, can be used in order to enter at least one letter or one digit.

Furthermore, switches are known which permit a plurality of lockable positions, such that it is possible to differentiate between different output states of the operating device in question by means of different switch settings. For example, it is possible when using the "MTO switch" commonly found on hearing aids to switch over between the operating modes "Microphone" and "Telecoil" and to turn the hearing aid on and off. However, only a very limited number of different switching functions can be implemented using this type of switch.

In addition, control elements are known in which the switching function depends on the number of actuations by the user. An example to quote for this is the program selection button of a hearing aid, where the selection of the hearing program depends on the number of actuations by the user. The disadvantageous aspect concerning the operation of a hearing aid by means of a program selection button is the fact that the user always has to count how often he has actuated the program selection button. Furthermore, in practice only a relatively limited number of hearing programs can also be differentiated in this situation.

A hearing aid having a pressure sensor in a film design is known from EP 0 548 379 A1, by means of which switching and control functions for the hearing aid can be performed as a result of the touch of a finger of a user.

A biometric identification system is known from EP 1 128 334 A1, in which the fingerprints of a plurality of fingers are stored. A random generator determines an arbitrary selection and sequence of fingerprints to be checked, whereby the system blocks access to an appliance or function after a predefinable number of failed attempts.

The object of the present invention is to set down an operating device for a hearing aid, which permits a large number of different operating functions with a small space requirement and with which the user is able to easily differentiate the different operating functions.

This object is achieved by an operating device having the features described in the independent claims.

The basic concept of the invention consists in designing at least one control element of the operating device of a hearing aid as a fingerprint sensor, whereby different operating functions are assigned to different fingers of a user. This means that the selection of at least one parameter which can be modified through the operation or the value of the modification depends on the finger with which the user actuates the fingerprint sensor. Actuation in this connection means—depending on the mode of operation of the fingerprint sensor used—either touching directly with the finger or placing the finger in the immediate vicinity of the fingerprint sensor such that unambiguous finger recognition is possible. A multiple assignment of one "key" of the operating device is accordingly created by virtue of the differentiation of individual fingers of the user, whereby the differentiation of individual operating functions is achieved not by way of a complicated menu navigation system but simply through actuation by different fingers of the user.

The operating device according to the invention comprises a fingerprint sensor for capturing a fingerprint. In addition the operating device comprises a memory and also a signal processor which enable data to be obtained by means of the fingerprint sensor and stored in the memory. Finally, an assignment of the fingerprints associated with different fingers of a person to different operating functions of the operating device is performed. The selection and assignment of the operating functions to individual fingers of the user can also take place in conjunction with a programming device which can be connected to the hearing aid in question.

As a result of advances in miniaturization in the field of fingerprint sensor technology, fingerprint sensors have in the meantime become obtainable on the market whose extent in terms of surface area barely extends beyond the extent in terms of surface area of a fingertip to be captured and whose construction depth lies in the millimeter or sub millimeter range. In addition, the energy consumption of the fingerprint sensor required for capturing a fingerprint is comparatively low, with the result that operation in a battery or accumulator powered hearing aid or a remote control for the hearing aid in question is thus also possible.

One embodiment of the invention, which makes possible an especially small form of construction for the operating device, provides a fingerprint sensor which in one sampling interval at least essentially captures only a single one-dimensional area, in other words one "line" of a finger to be sampled. In this situation, a complete fingerprint is obtained only by passing the finger across the sensor. In this situation, the fingerprint can be generated both by passing the finger across the sensor in the longitudinal direction and also at right angles to the longitudinal direction.

The operating device can itself be part of the hearing aid to be operated, in other words integrated into the latter. The operating device can however also be implemented as a portable remote control for the hearing aid separate from the hearing aid.

If data relating to the fingerprints of all ten fingers of a user is stored in the respective memory of the operating device, then a complete numeric block containing the digits 0 to 9 can be replaced by a single fingerprint sensor. In order to operate a hearing aid, according to the invention a plurality of fingerprints can also be captured in succession, as a result of which for example it is also possible to enter multi-digit decimal numbers by using a single fingerprint sensor.

By preference, the operating device according to the invention comprises a single fingerprint sensor as the single control element which can be actuated by a user for the operating device. An especially small form of construction of the operating device according to the invention is made possible as a result.

BRIEF DESCRIPTION OF THE DRAWINGS

The invention will be described in detail in the following with reference to an exemplary embodiment. In this case the figure shows a hearing aid having a strip-type fingerprint sensor and a remote control for the hearing aid having a rectangular fingerprint sensor.

DETAILED DESCRIPTION OF INVENTION

The figure shows a behind-the-ear hearing aid 1 which has a microphone 2 for capturing an acoustic input signal and converting it into an electrical input signal. The electrical input signal exiting from the microphone 2 is fed to a signal processing unit 3 in which frequency-dependent signal processing and amplification of the electrical input signal takes place. The signal processing unit 3 delivers at its signal output an electrical output signal which is fed to an earpiece 4 for conversion into an acoustic output signal. The acoustic output signal is fed by way of a carrier hook 5, which has a sound channel passing through it, a sound tube and an ear insert (not shown) to the ear of the user. In addition, according to the embodiment the hearing aid 1 also comprises an On/Off switch 6 and a battery 10 providing the power supply for the electronic components of the hearing aid 1.

The signal processing in the signal processing unit 3 can be modified to suit different hearing environments for the hearing aid 1. Such types of hearing environments are for example: "conversation in quiet", "conversation in background noise", "telephoning", "traveling in car" etc. To this end, parameter values optimized for the respective hearing situation are set in the signal processing unit 3. These sets of parameter values are also referred to as "hearing programs". In addition to the manual setting of a hearing program suitable for a particular hearing environment, further settings options are still often required by hearing aid users, in particular the setting of a comfortable volume level. In order to guarantee these setting options, hearing aids have to date been provided with a number of control elements. The fitting and operation of a plurality of control elements on a hearing aid do however prove to be extremely difficult on account of the degree of miniaturization aspired to for these devices. The use of a remote control offers a remedy, but this then also needs to be carried along as an another additional device.

The operating device of the hearing aid 1 according to the invention comprises a fingerprint sensor 7, by means of which a manual modification by the user of the signal processing in the hearing aid is enabled. By using a fingerprint sensor 7 according to the invention, a multiplicity of different operating functions can be performed in a simple manner with a single control element. In the embodiment, a fingerprint sensor of a one-dimensional design was chosen. This means that the sensor field of the fingerprint sensor 7 extends essentially merely in one direction. In principle, particularly in the case of behind-the-ear hearing aids, it would however also be possible to use a fingerprint sensor of a two-dimensional design. In addition to the fingerprint sensor 7 and the On/Off switch 6, the operating device of the hearing aid 1 also comprises a signal processing and memory unit 9 in which are stored data records relating to the fingerprints of a plurality of different fingers of a user and by means of which, after a finger is passed across the fingerprint sensor 7, the finger in question is recognized. Furthermore, an assignment between the data records of the fingerprints and the operating functions associated with them is also stored in the signal processing and memory unit 9. For example, "hearing program 1" is assigned to the thumb, "hearing program 2" to the forefinger etc. If the user touches the fingerprint sensor 7 with his forefinger, the parameter values assigned to the "hearing program 2" are accordingly set in the signal processing unit 3.

Advantageously, the operating device of the hearing aid 1 additionally has means which also make it possible to determine the direction of motion with which the finger in question was passed across the fingerprint sensor 7 from a comparison of a fingerprint obtained line by line with the data records relating to the different fingerprints, stored in the memory of the operating device. This means that by using the fingers of one hand alone the user is able to perform a multiplicity of different operating functions in conjunction with the fingerprint sensor 7. For example, the volume level setting can be assigned to the forefinger aligned parallel to the longitudinal axis of the fingerprint sensor 7, which forefinger is moved at right angles to this longitudinal axis.

The means for sensing the direction of motion in which the finger in question of the user is moved relative to the one-dimensional fingerprint sensor 7 across the fingerprint sensor 7 advantageously comprise at least one further sensor for sensing the corresponding direction of motion. For example, a rotatable small wheel or a rotatable ball can be arranged for this purpose in the immediate vicinity of the fingerprint sensor, said small wheel or a rotatable ball being set into a rotary motion by the finger passing across it, whereby the direction of motion of the finger can be determined from the rotary motion. Alternatively, the operating device could also be provided with a number of "fixed" sensors which sense whether they are covered by a finger. From these it is also possible to determine the direction of motion of the finger from a comparison of the output signals from a plurality of such sensors at different points in time. It is moreover also possible, without using additional sensors, solely by means of suitable image processing software to arrange in the correct sequence and at the correct spacing with respect to one another "line signals" which have been obtained in temporal succession, particularly in the situation when a comparison can be made with the comparison data set. In the embodiment the comparison data records used are the data records relating to the stored fingerprints. Corresponding software algorithms are known from scanner technology and in particular from medical diagnostics using imaging examination units, in which a line-by-line sampling of an examination object is likewise frequently performed, whereby the line signals obtained are combined to form two- or even three-dimensional data records.

From the comparison of the data obtained from passing a finger across the fingerprint sensor 7 with the data relating to the different fingerprints stored in the memory area of the signal processing and memory unit 9 the chosen finger can as a rule be unambiguously identified after just a few sampled lines. By this means it also becomes possible to additionally sense as a further parameter the distance by which the finger in question is moved across the fingerprint sensor 7 as an additional component with regard to operation. If for example the forefinger of the right hand moves only a few millimeters across the fingerprint sensor 7 at right angles to the fingerprint sensor 7, then this results in a slight increase in the volume level. If in contrast the finger is moved completely across the fingerprint sensor 7, then this means a large increase in the volume level. Passing the finger across in the opposite direction brings about a corresponding reduction in the volume level.

A further operating function using one and the same finger, the forefinger of the right hand for example, can be achieved as a result of "turning" the finger through 90°, in other words in the embodiment by moving the finger at right angles to the longitudinal axis of the fingerprint sensor 7. Since this is however not easily possible while the hearing aid 1 is not being worn on the head, the functions of turning the hearing aid on or off for example can be assigned to this finger and the associated motion, functions which are usually performed with the hearing aid removed from the head.

In similar fashion, further operating functions can be assigned to other fingers of the user.

By preference, the assignment of individual fingers and where applicable of their direction of motion as they pass across the fingerprint sensor 7 to individual operating functions, in other words at least essentially the selection and setting of individual parameters for the signal processing unit 3, takes place in conjunction with a programming device (not shown) to which the hearing aid 1 can be connected.

In an advantageous embodiment, the hearing aid 1 also has an antenna 8, by means of which it can exchange data in wireless fashion with a remote control 20. The remote control 20 also constitutes an inventive operating device of the hearing aid 1. To this end, in addition to a display 22, a signal processing and memory unit 23, an antenna 24 and a battery 25 it also has a fingerprint sensor 21. Similar to the manner described previously in conjunction with the hearing aid 1, an assignment of operating functions (in other words a selection of parameters and their settings) to the individual fingers of the user also takes place in the case of the remote control 20. Since more space is available on the remote control 20 than on the hearing aid 1, the fingerprint sensor 21 is advantageously of a two-dimensional design, with the result that the finger in question can be immediately recognized even with just a single touch. Depending on which finger touches the fingerprint sensor 21, a control signal is then generated in the signal processing and memory unit 23 and is transmitted to the hearing aid 1, by means of which an operating function assigned to the finger in question is performed in the hearing aid 1.

Apart from the fingerprint sensor 21, the remote control 20 comprises no further control elements which can be actuated by the user, with the result that a particularly small physical form is made possible for the remote control 20 by the invention.

The invention claimed is:

1. An operating device for a hearing aid, comprising:

a signal processing unit for processing an electrical input signal and emitting an electrical output signal; and a fingerprint sensor for detecting a fingerprint, wherein a parameter of the signal processing unit in the hearing aid is modified by a single actuation of the fingerprint sensor by a finger of a user, and wherein the parameter is selected as a function of the finger with which the user actuates the fingerprint sensor.

2. The operating device as claimed in claim 1, wherein the fingerprint sensor is a one-dimensional design and a two-dimensional fingerprint is generated by passing the finger across the fingerprint sensor.

3. The operating device as claimed in claim 1, wherein the fingerprint sensor is at least essentially of a one-dimensional design and a two-dimensional fingerprint is generated by passing the finger across the fingerprint sensor.

4. The operating device as claimed in claim 1, wherein the fingerprint sensor is of a two-dimensional design.

5. The operating device as claimed in claim 3, wherein the direction in which the finger is moved relative to the finger print sensor is determined.

6. The operating device as claimed in claim 5, wherein a signal volume is adjusted according to the movement.

7. The operating device as claimed in claim 4, wherein the direction in which the finger is moved relative to the fingerprint sensor is determined.

8. The operating device as claimed in claim 7, wherein a signal volume is adjusted according to the movement.

9. The operating device as claimed in claim 1, wherein the fingerprint sensor is permanently connected to the hearing aid.

10. The operating device as claimed in claim 1, further comprises a remote control for the hearing aid, wherein the remote control includes the fingerprint sensor.

11. The operating device as claimed in claim 10, wherein the finger sensor is the only control element which can be manually actuated.

12. The operating device as claimed in claim 1, wherein the finger sensor is the only control element which can be manually actuated.

13. An operating device for a hearing aid, comprising:

a fingerprint sensor for detecting a fmgerprint; and a signal processing unit for processing an electrical input signal and emitting an electrical output signal, the signal processing unit having a plurality of parameters relating to the processing, each parameter associated to a fingerprint, wherein after the fingerprint sensor detects a fingerprint, the parameter associated with the respective fingerprint is modified.

14. The operating device as claimed in claim 13, wherein a direction in which the finger is moved relative to the fingerprint sensor is determined, and wherein the parameter is modified based on the direction of movement.

15. The operating device as claimed in claim 14, wherein a signal volume is adjusted via the movement.

16. The operating device as claimed in claim 13, further comprises a remote control for the hearing aid, wherein the remote control includes the fingerprint sensor.

17. A method for adjusting a signal processing of a hearing aid, comprising:

detecting a fingerprint of the hearing aid user by a fingerprint sensor; and modifying a parameter associated with the fingerprint, wherein the signal processing of the hearing aid is adjusted via the modification.

18. The method as claimed in claim 17, wherein a direction in which the finger is moved relative to the fingerprint sensor is determined, and wherein the parameter is modified based on the direction of movement.

19. The method as claimed in claim 18, wherein a signal volume is adjusted via the movement.

* * * * *